UNITED STATES PATENT OFFICE.

HARRISON HELM, OF GODWIN, TENNESSEE.

REMEDY FOR SCROFULA.

SPECIFICATION forming part of Letters Patent No. 389,651, dated September 18, 1888.

Application filed March 30, 1888. Serial No. 268,932. (No specimens.)

*To all whom it may concern:*

Be it known that I, HARRISON HELM, a citizen of the United States, residing at Godwin, in the county of Maury and State of Tennessee, have invented a new and useful Improvement in Medical Compounds, of which the following is a specification.

The invention is a composition of matter forming a medical compound, to be used, principally, for the treatment of scrofula, but also useful in the treatment of rheumatism.

The said compound consists of the following ingredients, taken in about the following proportions: iron-weed (*Vernonia novæboracencis*), one and four-fifths ounce; water, one pint; chloride of sodium, two table-spoonfuls; nitrate of potassa, one-half tea-spoonful. This mixture forms a wash or lotion, which is adapted to be used to bathe the parts affected with either scrofula or rheumatism.

The method of preparing the compound is as follows: Boil the iron weed for about fifteen minutes in the water, and while the liquid is hot dissolve the saltpeter and common salt therein. The mixture is then, when cool enough, ready for use.

Having described my invention, I claim—

The herein-described composition of matter forming a lotion, and consisting of the following ingredients, in about the following proportions, namely: iron-weed (*Vernonia novæboracencis*), one and four-fifths ounce; water, one pint; chloride of sodium, two table-spoonfuls, and nitrate of potassa, one-half tea-spoonful, as specified.

In testimony that I claim the foregoing as my own I have hereto affixed my signature in presence of two witnesses.

his
HARRISON  ×  HELM.
                      mark.

Witnesses:
   WILLIAM H. WILSON,
   THOMAS H. DODSON.